(12) United States Patent
Chen

(10) Patent No.: US 7,276,685 B2
(45) Date of Patent: Oct. 2, 2007

(54) OPTICAL SYSTEM WITH PHOTO CATALYTIC REACTOR AND INCIDENT BEAM SPLITTER

(75) Inventor: Ga-Lane Chen, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/397,006

(22) Filed: Apr. 3, 2006

(65) Prior Publication Data

US 2007/0051873 A1 Mar. 8, 2007

(30) Foreign Application Priority Data

Sep. 5, 2005 (TW) .............................. 94130338 A

(51) Int. Cl.
*H01J 3/14* (2006.01)
(52) U.S. Cl. .................................... 250/216; 250/222.2
(58) Field of Classification Search ................ 250/216, 250/222.2, 208.1, 221, 239; 422/186, 186.3; 356/338, 437, 438, 442
See application file for complete search history.

(56) References Cited

U.S. PATENT DOCUMENTS 5,835,840 A * 11/1998 Goswami ................. 422/186.3
6,833,089 B1 12/2004 Kawahara et al.

* cited by examiner

*Primary Examiner*—Que T Le

(74) *Attorney, Agent, or Firm*—Jeffrey T. Knapp

(57) ABSTRACT

An optical system (10) operatively associated with incident light (50) is provided. The incident light is essentially comprised of a first part (52) and a second part (54). The optical system includes: a photo catalytic reactor (30) comprising a photo catalyst (36) operatively associated with the first part of the incident light, an optical device (20) operatively associated with the second part of the incident light, and a beam splitter (40) for separating the incident light into the first part which is directed to the photo catalyst and the second part which is directed to the optical device.

19 Claims, 3 Drawing Sheets

OPTICAL SYSTEM WITH PHOTO CATALYTIC REACTOR AND INCIDENT BEAM SPLITTER

BACKGROUND

1. Technical Field

The present invention relates to optical systems, and particularly to an optical system with a photo catalytic reactor.

2. Discussion of Related Art

Optical systems are widely used in optical and photo-electronic products. Most light sources used in such products provide continuous optical spectrum emissions including visible light, ultraviolet (UV) light and infrared (IR) light. However, visible light is usually the only light really needed for routine operation of such optical systems, while involving UV light and IR light often causes undesired side effects. Thus, extra filter elements are usually employed for eliminating UV and/or IR radiation from the incident light.

However, although the light of UV or IR band is considered harmful to above-mentioned optical systems, it is often utilized in photochemical reactions. In particular, it is employed for providing power to initiate photochemical processes including the self-cleaning, self-sanitizing, and self-deodorizing of an apparatus.

Therefore, what is needed is an optical system adapted for efficiently and optionally utilizing UV band, IR band and/or visible band radiation.

SUMMARY

An optical system operatively associated with incident light is provided. The incident light is essentially comprised of a first part and a second part. The optical system includes: a photo catalytic reactor comprising a photo catalyst operatively associated with the first part of the incident light, an optical device operatively associated with the second part of the incident light, and a beam splitter for separating the incident light into the first part which is directed to the photo catalyst and the second part which is directed to the optical device.

BRIEF DESCRIPTION OF THE DRAWINGS

Many aspects of the present optical system can be better understood with reference to the following drawings. The components in the drawings are not necessarily to scale, the emphasis instead being placed upon clearly illustrating the principles of the present optical system. Moreover, in the drawings, like reference numerals designate corresponding parts throughout the several views.

DETAILED DESCRIPTION OF PREFERRED EMBODIMENTS

Reference will now be made to the drawings to describe in detail the preferred embodiments of the present optical system.

Figure 1:
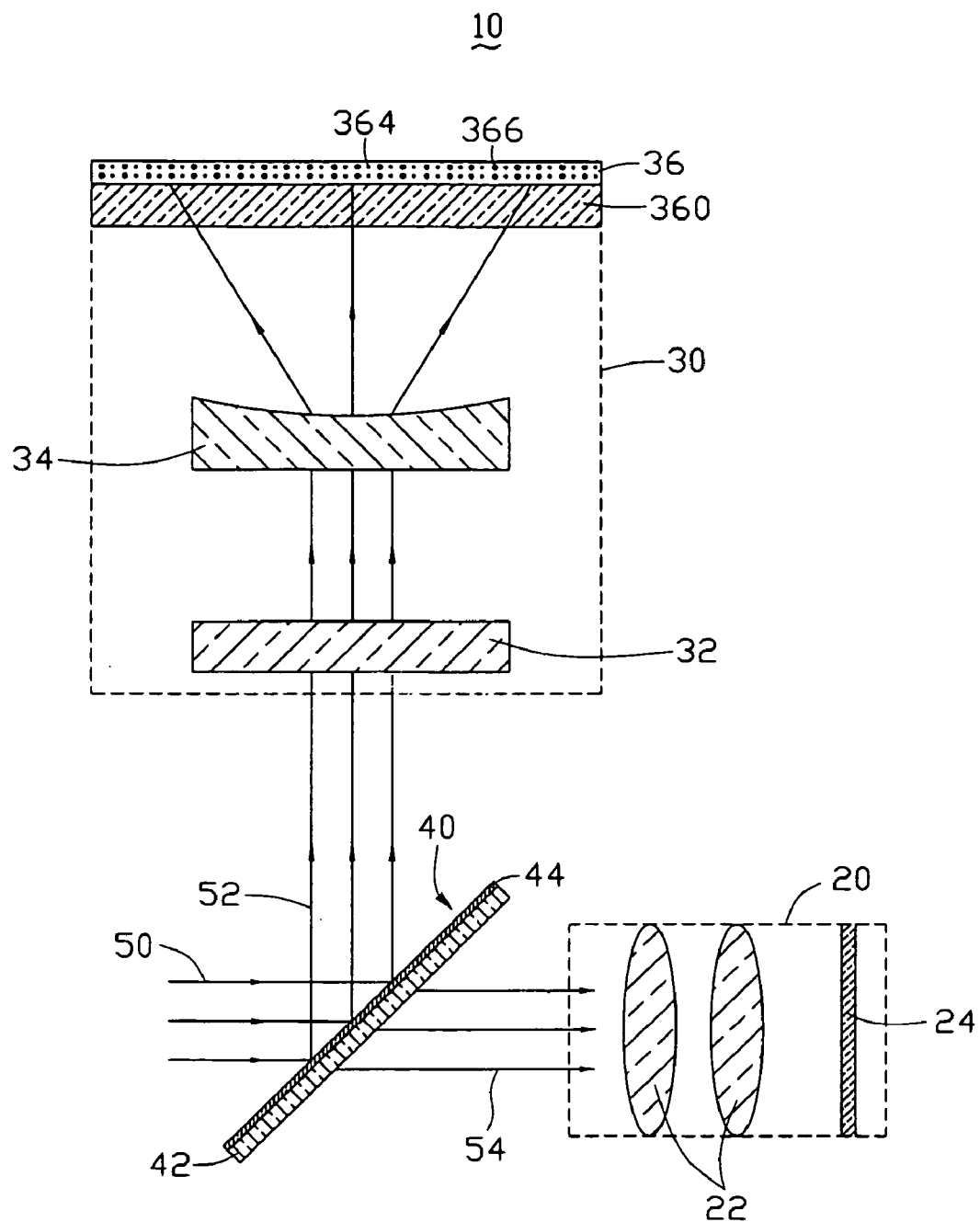
FIG. 1 is a schematic, cross-sectional view of an optical system in accordance with a preferred embodiment.

Referring to FIG. 1, an optical system 10 includes an optical device 20, a photo catalytic reactor 30, and a beam splitter 40. The beam splitter 40 is adapted for separating incident light 50 into at least a first part 52 and a second part 54. The first part 52 is directed to the photo catalytic reactor 30, and the second part 54 is directed to the optical device 20.

The optical device 20, according to the illustrated embodiment, includes a lens assembly 22 and an image sensor 24, disposed along a path of the incident light 50. The image sensor 24 may be for example a sensitive film, a complementary metal-oxide semiconductor (CMOS) image sensor or a charge coupled device (CCD) image sensor.

The photo catalytic reactor 30 includes a diffusion sheet 32, a divergent lens 34, and a photo catalyst 36, disposed in that sequence along a light path of the reflected light 52. The photo catalytic reactor 30 further includes a substrate 360 with the photo catalyst 36 provided thereon. The photo catalyst 36 is in a form of a layer having a thickness in the range from 20 nm to 1000 nm, and preferably between 50 nm to 500 nm. The substrate 360 is advantageously made of a transparent material, such as glass, silicon, polymethyl methacrylate (PMMA), polycarbonate (PC), or transparent glass-ceramic.

According to an aspect of the present optical system 10, the photo catalyst 36 includes a plurality of metal particles 364 and/or a plurality of oxide particles 366. The metal and/or oxide particles 364, 366 are beneficially dispersed uniformly or randomly in the photo catalyst 36. The metal and/or oxide particles 364, 366 can be coated or deposited on at least one surface of the substrate 360 simultaneously in a coating/depositing process, for example, by an RF magnetron co-sputtering process.

Figure 4:
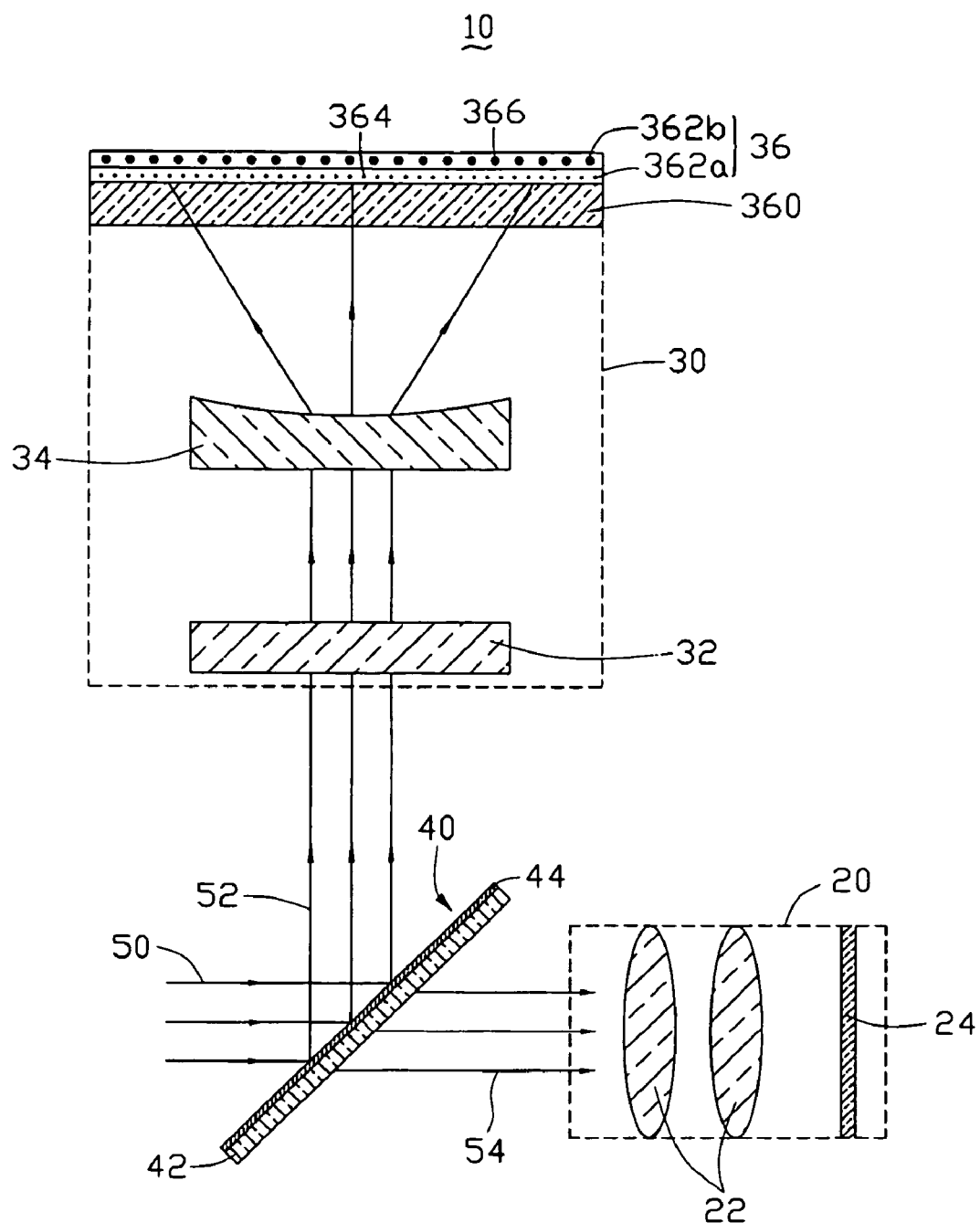
FIG. 4 is a schematic, cross-sectional view of an optical system in accordance with another preferred embodiment.

Alternatively, as shown in FIG. 4, according to another aspect of the present optical system 10, the photo catalyst 36 has a laminated structure including a first photo catalytic film 362a comprised of a plurality of metal particles 364, and a second photo catalytic film 362b comprised of a plurality of oxide particles 366. The first photo catalytic film 362a is coated or deposited on one surface of the substrate 360, and the second photo catalytic film 362b is coated or deposited on the first photo catalytic film 362a. Yet, according to an aspect of the embodiment, since the metal and oxide particles 364, 366 have certain photo catalytic capabilities, the photo catalyst 36 can also include only one of the first and the second photo catalytic films 362a, 362b. It is to be noted that although two photo catalytic films 362a, 362b are exemplarily illustrated herein, more or less photo catalytic films can be optionally selected by those skilled in the art, according to the principles of the present invention.

The metal particles 364 are advantageously made of a metal material, which has an excellent absorption to IR band light. The metal material is preferably selected from a group consisting of gold (Au), silver (Ag), platinum (Pt), and any alloy thereof. The metal particles 364 have an average grain size in the range from about 1 nm to about 1000 nm. The average grain size is preferably in the range from about 10 nm to about 100 nm.

The oxide particles 366 are advantageously made of an oxide material, which has an excellent absorption to UV band light. The oxide material is preferably selected from a group consisting of titanium dioxide ($TiO_2$), zinc oxide (ZnOx), ferric oxide ($Fe_2O_3$), nickel oxide (NiOx), cobalt oxide (CoOx), and any mixtures thereof. The oxide particles 366 have an average grain size in the range from about 5 nm to about 1000 nm. The average grain size is preferably in the range from about 10 nm to about 200 nm.

The beam splitter 40 includes a substrate 42, and an optical filter 44 formed on one surface of the substrate 42. The substrate 42 is advantageously made of a transparent material, such as, glass, silicon, PMMA, PC, or transparent glass-ceramic.

Figure 2:
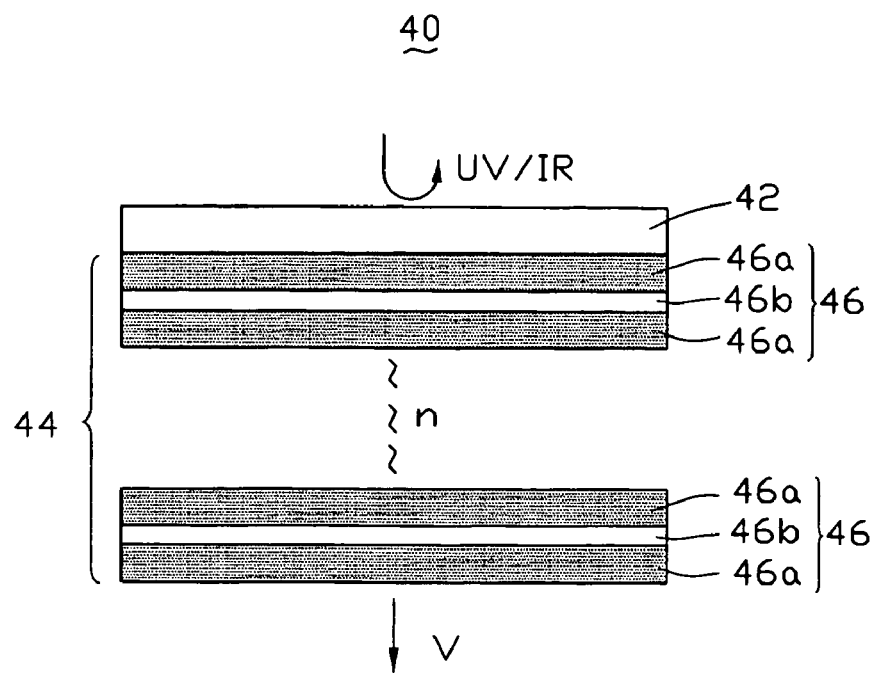
FIG. 2 is an enlarged view of an optical filter of the optical system of FIG. 1.

Referring to FIG. 2, the optical filter 44 of the beam splitter 40 is schematically and structurally illustrated. The optical filter 44 includes a plurality of triple-layer cavities 46 formed on the substrate 42. The optical filter 44 is configured for reflecting the first part 52 of the incident light 50 towards the photo catalyst 36, and allowing the second part 54 of the incident light 50 to be transmitted therethrough. Each triple-layer cavity 46 includes three thin optical films, each having a thickness equal to a quarter of the central wavelength thickness, the center wavelength being determined according to practical application. In details, each triple-layer cavity 46 includes two first thin optical films 46a having a high refractive index and a second thin optical film 46b having a low refractive index. The second thin optical film 46b is sandwiched between the two first thin optical films 46a. The triple-layer cavities 46 are stacked one on another, thus forming the optical filter 44. The triple-layer cavities 46 are preferably arranged in the order of, 0.5HL0.5H (0.5HL0.5H)n 0.5HL0.5H, wherein (0.5HL0.5H) represents a triple-layer cavity 46; H represents the first thin optical film 46a; 0.5 represents an optical thickness coefficient of the first thin optical film (H) 46a; L represents the second thin optical film 46b; and n, which is an integer, representing the number of repetitions of the cavity 46. The number n is generally in the range from 8 to 20, and in the illustrated embodiment, n is 16.

The operation principle is described as follows, using Ag and TiO2 as examples for the above-illustrated metal and oxide particles 364, 366.

In operation, light 50 incident on the beam splitter 40 is separated into at least a first part 52 and a second part 54. The first part 52 is reflected towards the photo catalyst 36, and the second part 54 is transmitted therethrough to the optical device 20. According to an aspect of the embodiment, the first part 52 of the incident light 50 is directed to the diffusion sheet 32. According to another aspect of the embodiment, the first part 52 of the incident light 50 includes UV band light, i.e., light wavelength below about 400 nm, and/or IR band light, i.e., light wavelength from about 700 nm to about 1100 nm. The second part 54 of the incident light 50 includes visible band, i.e., from about 400 nm to about 700 nm.

Figure 3:
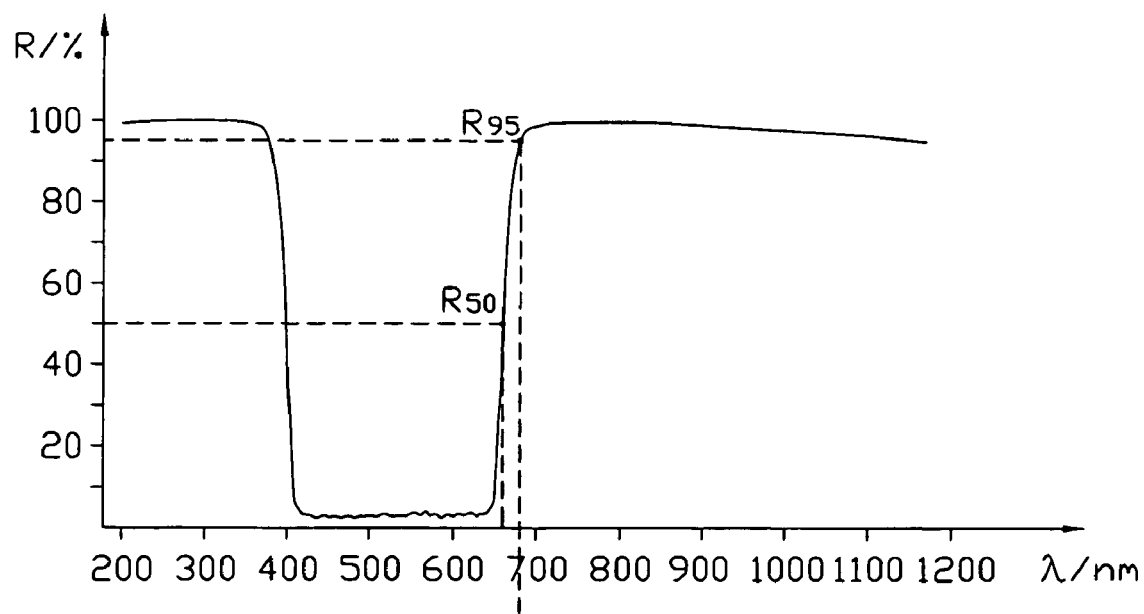
FIG. 3 is a graph showing a reflection spectrum associated with the beam splitter of FIG. 1.

FIG. 3 illustrates a reflection spectrum of the beam splitter 40. As shown in FIG. 3, a reflectivity of UV band light and IR band light of the beam splitter 40 is generally higher than 90 percent. For the light of UV band, R95, that is the wavelength where the reflectivity (R) of IR light is 95 percent, beneficially corresponds to a wavelength of 420±10 nm. For the sharp cutting slope, R50 beneficially corresponds to a wavelength of 380±10 nm. Similarly, for the light of IR band, R95 beneficially corresponds to a wavelength of 680±20 nm. For the sharp cutting slope, R50 beneficially corresponds to a wavelength of 650±10 nm. As such, for the visible light, the reflection ratio thereof is optimally below 10 percent.

The diffusion sheet 32 is adapted for diffusing light incident thereon. After being diffused, the UV and/or IR light becomes more uniform, and then passes through the divergent lens 34. The divergent lens diverges the UV and IR light, thus increasing the reaction area. The diverged light of UV and/or IR band is then incident onto the photo catalyst 36, i.e., the Ag and TiO$_2$ photo catalytic particles. When irradiated by UV light, particles of TiO$_2$ react with adjacent molecules, e.g., water and/or oxygen. A plurality of hydrogen ions (H$^+$), hydroxyl ions (OH$^-$), and free radicals having strong reductive and oxidative capabilities (such as O$^-$, O$_2^-$, and O$_3^-$), are produced by such reaction. Thus, contaminants on an exposed surface of the substrate 360 can be decomposed by the free radicals and then removed accordingly. In addition, large water droplets will not readily form on the surface of the substrate 360 due to the presence of hydrogen ions (H$^+$) and hydroxyl ions (OH$^-$) thereon. A contact angle between any water droplet and the surface of the substrate 360 is reduced to a value approximate to zero, which is significantly less than a corresponding contact angle in the case where no photo catalytic materials are used. That is, the surface of the substrate 360 is rendered super hydrophilic after irradiation by UV light. As a result, the photo catalyst 36 has improved efficiency of, e.g., anti-bacteria and anti-viral disinfection, deodorization, detoxication, self-cleaning, or anti-fogging.

It is to be noted that although visible light and light of UV/IR band are exemplarily illustrated in the embodiments, different lights bands can be alternatively selected according to practical application, within the spirit of the present invention, in that similar structures may be modified by using different optical film design and/or materials of the films and photo catalyst in accordance with the alternatively selected EM bands.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. An optical system operatively associated with incident light essentially comprised of a first part and a second part, the optical system comprising:
    a photo catalytic reactor comprising a photo catalyst operatively associated with the first part of the incident light;
    an optical device operatively associated with the second part of the incident light; and a beam splitter for separating the incident light into the first part which is directed to the photo catalyst and the second part which is directed to the optical device.

2. The optical system as described in claim 1, wherein the optical device comprises a lens assembly and an image sensor, the lens assembly and the image sensor being disposed along a path of the second part of the incident light.

3. The optical system as described in claim 1, wherein the beam splitter comprises a substrate and an optical filter formed on the substrate, the optical filter being configured for reflecting the first part of the incident light towards the photo catalyst, and allowing the second part of the incident light to transmit therethrough.

4. The optical system as described in claim 3, wherein the optical filter comprises a plurality of triple-layer cavities, each of the triple-layer cavities comprising two first thin optical films and a second thin optical film, the second thin optical film being sandwiched between the first thin optical films.

5. The optical system as described in claim 4, wherein the first thin optical film has a higher refractive index than the second thin optical film does, the refractive index of the first thin optical film being in the range from about 2.0 to about 2.3, and the refractive index of the second thin optical film being in the range from about 1.4 to about 1.6.

6. The optical system as described in claim 3, wherein the first part of the incident light has a wavelength substantially in at least one of ultraviolet band and infrared band.

7. The optical system as described in claim 1, wherein the photo catalytic reactor further comprises a diffusion sheet and a divergent lens, the divergent lens being arranged between the diffusion sheet and the photo catalyst.

8. The optical system as described in claim 1, wherein the photo catalytic reactor further comprises a substrate with the photo catalyst provided thereon.

9. The optical system as described in claim 8, wherein the photo catalyst is comprised of at least one of a plurality of metal particles and a plurality of oxide particles.

10. The optical system as described in claim 8, wherein the metal particles are comprised of a material selected from the group consisting of gold, silver, platinum, and any combination alloy thereof.

11. The optical system as described in claim 9, wherein the metal particles have an average grain size in the range from about 1 nm to about 1000 nm.

12. The optical system as described in claim 9, wherein the oxide particles are comprised of a material selected from the group consisting of titanium dioxide, zinc oxide, ferric oxide, nickel oxide, cobalt oxide, and any combination thereof.

13. The optical system as described in claim 9, wherein the oxide particles have an average grain size in the range from about 5 nm to about 1000 nm.

14. The optical system as described in claim 7, wherein the photo catalyst has a laminated structure comprising a first photo catalytic film and a second photo catalytic film, the first photo catalytic film being comprised of a plurality of metal particles, and the second photo catalytic film being comprised of a plurality of oxide particles.

15. The optical system as described in claim 14, wherein the metal particles are comprised of a material selected from the group consisting of gold, silver, platinum, and any alloys thereof.

16. The optical system as described in claim 14, wherein the metal particles have an average grain size in the range from about 1 nm to about 1000 nm.

17. The optical system as described in claim 14, wherein the oxide particles are comprised of a material selected from the group consisting of titanium dioxide, zinc oxide, ferric oxide, nickel oxide, cobalt oxide, and any combination thereof.

18. The optical system as described in claim 14, wherein the oxide particles have an average grain size in the range from about 5 nm to about 1000 nm.

19. The optical system as described in claim 8, wherein the photo catalyst is in a form of a layer having a thickness in the range from 20 nm to 1000 nm.

\* \* \* \* \*